US012725320B2

(12) United States Patent
Pernias Pascual de Pobil et al.

(10) Patent No.: US 12,725,320 B2
(45) Date of Patent: Sep. 1, 2026

(54) IMAGE STYLE TRANSFER

(71) Applicant: DISNEY ENTERPRISES, INC., Burbank, CA (US)

(72) Inventors: Pablo Pernias Pascual de Pobil, San Juan de Alicante (ES); Santiago Iglesias Navarro, Palma de Mallorca (ES); Robert B. Moore, Clermont, FL (US); David N. Juboor, Johnson City, TN (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 74 days.

(21) Appl. No.: 18/425,371

(22) Filed: Jan. 29, 2024

(65) Prior Publication Data

US 2025/0245878 A1 Jul. 31, 2025

(51) Int. Cl.
*G06T 11/10* (2026.01)

(52) U.S. Cl.
CPC ......... *G06T 11/10* (2026.01); *G06T 2211/441* (2023.08)

(58) Field of Classification Search
CPC ..... G06T 11/001; G06T 11/60; G06N 3/0455; G06V 10/44
See application file for complete search history.

(56) References Cited

U.S. PATENT DOCUMENTS

| | | | | |
|---|---|---|---|---|
| 11,610,351 | B2 | 3/2023 | Bethge et al. | |
| 12,159,334 | B2 | 12/2024 | Kuta et al. | |
| 12,340,440 | B2 | 6/2025 | Chandran et al. | |
| 12,345,806 | B2 | 7/2025 | Lyu et al. | |
| 2020/0134150 | A1 | 4/2020 | Hunegnaw | |
| 2021/0358164 | A1* | 11/2021 | Liu | G06N 3/088 |
| 2022/0004921 | A1* | 1/2022 | Balaraman | G06N 20/00 |
| 2022/0156987 | A1 | 5/2022 | Chandran et al. | |
| 2024/0354895 | A1* | 10/2024 | Ravi | G06V 10/82 |
| 2025/0078349 | A1* | 3/2025 | Cho | G06T 11/60 |
| 2025/0111573 | A1 | 4/2025 | Phan | |
| 2025/0245884 | A1* | 7/2025 | Iglesias Navarro | G06T 11/60 |
| 2025/0371426 | A1* | 12/2025 | Fortkort | G06N 20/00 |

OTHER PUBLICATIONS

"U.S. Appl. No. 18/655,143, filed May 3, 2024, entitled "Speed and Flexibility in Style Transfer"".

(Continued)

*Primary Examiner* — Antonio A Caschera
(74) *Attorney, Agent, or Firm* — Dorsey & Whitney LLP

(57) ABSTRACT

Techniques for generating modified images using content information and style information are disclosed. First image data comprising image content information is received, and a content encoder generates a first embedding by extracting the image content information from the first image data. A second embedding generated by a style encoder is received, the second embedding comprising style information of second image data. The style information comprises color information and texture information. A decoder generates a modified image using the first embedding and the second embedding, the modified image comprising the image content information of the first image data and the style information of the second image data.

28 Claims, 4 Drawing Sheets

(56) References Cited

OTHER PUBLICATIONS

"U.S. Appl. No. 18/655,147, filed May 3, 2024, entitled "Differentiable Composition of Attributes in Style Transfer"".
"U.S. Appl. No. 18/655,150, filed May 3, 2024, entitled "Semi-Supervised Style Transfer"".
Gatys, et al., "A Neural Algorithm of Artistic Style.", Sep. 2, 2015 Journal of Vision 2016;16(12):326. https://doi.org/10.1167/16.12.326.
Gatys, et al., "Controlling Perceptual Factors in Neural Style Transfer", 2017 IEEE Conference on Computer Vision and Pattern Recognition (CVPR), Honolulu, HI, USA, 2017, pp. 3730-3738, doi: 10.1109/CVPR.2017.397.
Gatys, et al., "Image style transfer using convolutional neural networks", Proceedings ofthe IEEE conference on computervision and pattern recognition. 2016. pp. 2414-2423. doi: 10.1109/CVPR.2016.265.

* cited by examiner

IMAGE STYLE TRANSFER

CROSS REFERENCE TO RELATED APPLICATION

This application is related to the Applicant's concurrently filed application titled "Facial Image Swapping," which is incorporated herein by reference in its entirety for all purposes.

FIELD

Described embodiments relate generally to generating modified images, such as modified images comprising content information of a first image and style information of a second image.

BACKGROUND

Digital images can be modified in various ways to generate modified images. For example, modified images can be generated to combine characteristics or content of images. Images can also be modified by adding or removing content. Image manipulations can be applied manually or using various algorithms. Current processes do not enable true blending of image content (e.g., person or object representations) to be modified in various styles and allow a user to change the amount of style influence on the modified content.

SUMMARY

The following Summary is for illustrative purposes only and does not limit the scope of the technology disclosed in this document.

In an embodiment, a computer-implemented method of generating modified images using content information and style information is disclosed. First image data is received including image content information. The image content information can include positional information of a set of features in the first image data. A first embedding (e.g., a content embedding) is generated using a content encoder, the first embedding including the image content information. To generate the first embedding, the content encoder extracts the image content information from the first image data. A second embedding generated by a style encoder is received, the second embedding comprising style information of second image data. The style information includes color information and texture information. The style information can be associated with an animation style or an artistic style or technique. A modified image is generated by a decoder using the first embedding and the second embedding. The modified image includes the image content information of the first image data and the style information of the second image data. In some implementations, different style information of third image data is applied to at least a portion of the modified image.

In some implementations, the content encoder, the style encoder, and the decoder are included in a machine-learned (ML) model. In these and other implementations, the method further includes receiving a plurality of image data including a plurality of image content information and a plurality of style information, generating a training dataset using the received plurality of image data, the received plurality of image data being pre-processed by performing segmentation to identify features in the plurality of image content information, and training the ML model using the generated training dataset, the training including determining a set of loss functions and corresponding weights for the loss functions. The method can further include evaluating accuracy of the trained ML model using a testing dataset including at least a portion of the training dataset, and retraining the trained ML model when the accuracy does not exceed a threshold accuracy, the retraining including adjusting a set of weights or training the ML model using a different training dataset In another embodiment, a system is disclosed including one or more processors and one or more memories carrying instructions configured to cause the one or more processors to perform the foregoing methods.

In yet another embodiment, a computer-readable medium is disclosed carrying instructions configured to cause one or more computing systems or one or more processors to perform the foregoing methods.

DETAILED DESCRIPTION

Figure 1:
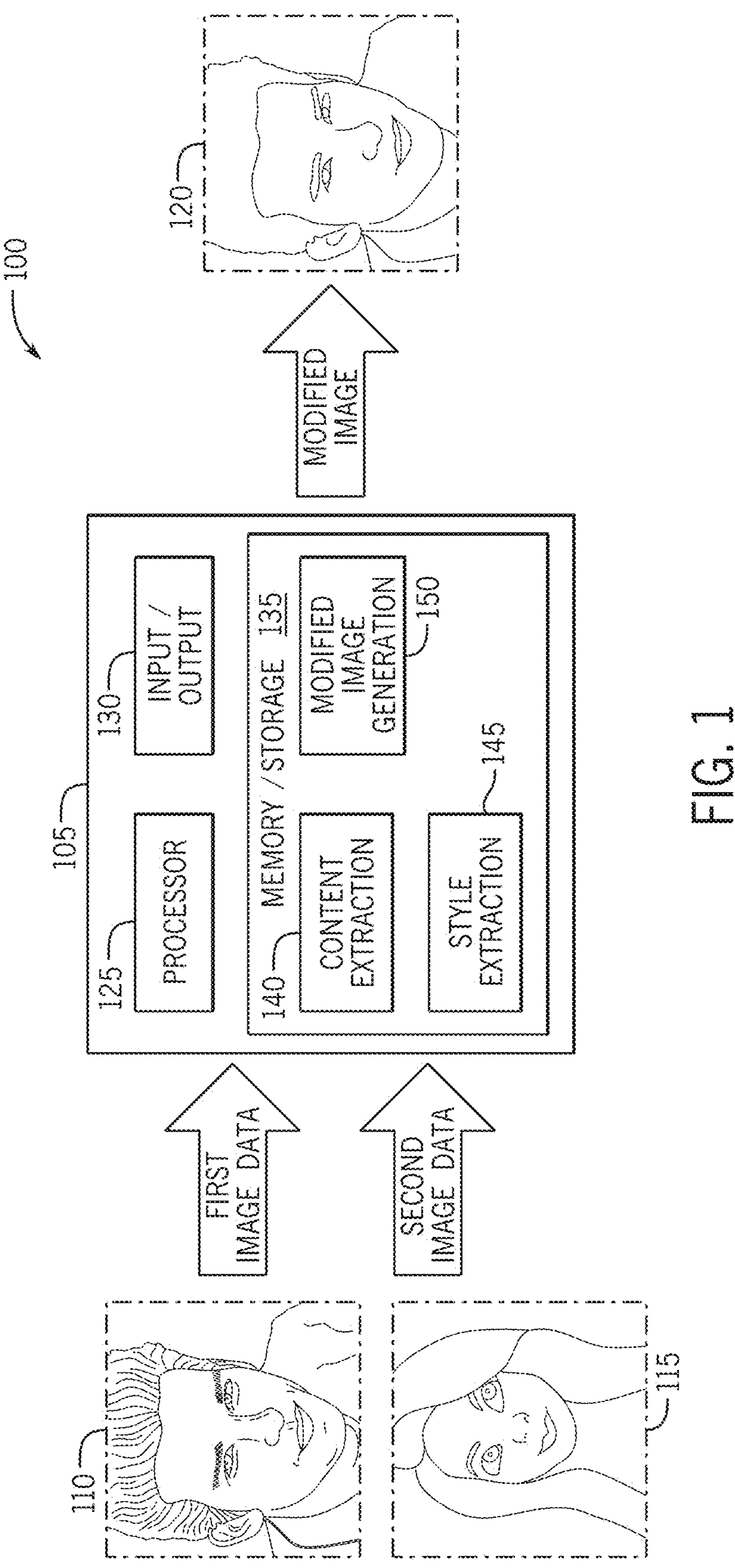
FIG. 1 is a block diagram illustrating a system flow for image style transfer.

Conventional techniques to modify images may use manual processes or simple algorithms that may provide only limited functionality to transfer content or style information between images. Further, while certain systems may allow content of a first image to be modified using style information of a second image, this kind of style transfer is typically limited to a small number of styles generated using narrow training processes, such as processes to train models that generate images in only a small number of styles (e.g., one style, fewer than 10 styles). Such systems cannot efficiently train models to perform many-to-many transfers of style or content information between images. Further, existing systems do not allow scaling or modification of "influence" of style with respect to an image-instead, the content is wholesale modified to fit the style rather than a more nuanced approach.

Various embodiments described herein enable the generation of modified images using a ML model based on style information and content information. As used herein, content refers to objects and shapes included or represented in an image separate from style information. Examples of content or shape information can include facial features (e.g., eyes, nose, mouth, eyebrows, face shape), hair, people, animals, buildings, inanimate objects, and so forth. As used herein, style refers to various image characteristics separate from image content, such as color, texture, animation characteristics, or the like. For example, a watercolor style can indicate color and texture characteristics simulating a watercolor painting (e.g., brush strokes, color mixing), and various animation styles can indicate color and texture characteristics simulating animated images (e.g., hand-drawn or traditional animation, three-dimensional animation, Claymation, stop motion). Other styles can be based on particular artists, movies or television programs, artistic movements or techniques, or the like. Content is represented differently based on the style, e.g., the same hair with a first style, such as a photo-realism style, will look very different from the same hair represented with a second style, such as a watercolor style, with the first style having sharp edges and refined detail whereas the second style may have a general shape and volume of the hair as a whole but blurred or softened edges and colors.

One or more ML models extract characteristics from image data and generate modified images, where the modified images include the content from a first image but represent the content in a different style. Various embodiments include a style encoder, a content encoder, and a decoder configured to extract image characteristics and combine the extracted image characteristics to generate modified images using the extracted characteristics. A ML model can comprise one or more neural networks, such as general adversarial networks (GANs). For example, a content encoder is trained to extract content information from image data and a style encoder is trained to extract style information from image data. The content information and the style information is then used to generate respective embeddings (e.g., vector representations), which can be combined (e.g., using a decoder) to generate modified images. As used herein, an encoder refers to at least a portion of a ML model configured to receive an input (e.g., image data) and generate a latent representation of the input. The latent representation can include an embedding, which is a set of one or more coordinates in a n-dimensional space (e.g., a vector). An embedding refers to a representation of data as points or coordinates in a dimensional space where respective locations are semantically meaningful. As used herein, a decoder refers to at least a portion of a ML model configured to receive the latent representation generated by the encoder and generate an output (e.g., reconstructed or modified image data).

Utilizing the ML model and architecture, efficient and accurate style transfer can be done to a number of different input images. For example, the system can generate modified images using content extracted from an image and apply style information from a different image with improved efficiency and results, as compared to existing systems that may require manual input. Additionally, the disclosed technology allows for a single input image to be used to generate various styles of output images, which improves technologies for animation, illustration, and the like. Moreover, various embodiments allow different degrees or weights of influence to be applied, such as modifying content data using 50% influence from a first style and 50% influence of a second style. Different weights can also be applied, and more than two styles can be applied to the same image content. In some implementations, different style information can additionally or alternatively be applied to different parts of image data. For example, for an image of a face, a first style can be applied to the eyes, a second style can be applied to the mouth, and a third style can be applied to the nose. In various embodiments, an ML model can be trained and applied without normalization of inputs (e.g., image data), and the disclosed technology instead relies on residuality and a proper weight initialization for stability.

FIG. 1 is a block diagram illustrating a system flow 100 for image style transfer. The system flow 100 utilizes an image transfer system 105 that receives first image data 110 including content information and second image data 115 including style information. Based on the first image data 110 and the second image data 115 the system 105 generates a modified image 120, which includes the content information extracted from the first image data 110 and the style information extracted from the second image data 115. In other words, a style of the second image data 115 (e.g., color information, texture information, animation characteristics) is applied to the content information of the first image data 110 to generate the modified image 120.

The system 105 includes at least one processor 125, which can be a central processing unit (CPU), a graphics processing unit (GPU) and/or one or more hardware or virtual processing units or portions thereof (e.g., one or more processor cores). The at least one processor 125 can be used to perform calculations and/or execute instructions to perform operations of the system 105, e.g., train and execute an ML model. The system 105 further includes one or more input/output components 130. The input/output components 130 can include, for example, a display to provide one or more interfaces provided by the system 105, to display data, such as first image data 110, second image data 115, and modified images 120. Additionally or alternatively, input/output components 130 can include various components for receiving inputs, such as a mouse, a keyboard, a touchscreen, a biometric sensor, a wearable device, a device for receiving gesture-based or voice inputs, and so forth. In an example implementation, the input/output components 130 are used to provide one or more interfaces for displaying modified images 120 and receiving first image data 110 and second image data 115.

One or more memory and/or storage components 135 are included in the system 105, which can store and/or access modules of the system 105, the modules including at least a content extraction module 140, a style extraction module 145, and/or a modified image generation module 150. The memory and/or storage components 135 can include, for example, a hardware and/or virtual memory, and the memory and/or storage components 135 can include non-transitory computer-readable media carrying instructions to perform operations of the system 105 described herein.

The content extraction module 140 can comprise pre-processing logic and at least a portion of a ML model (e.g., a content encoder) configured to receive the first image data 110 and extract content information from the first image data 110. In various implementations, the content extraction module 140 performs content segmentation to identify and encode identified segments of the first image data 110, such as eyes, mouth, ears, hair, eyebrows, and so forth. In some examples, the content extraction module 140 pre-processes the first image data 110 to identify one or more features present in the first image data 110, such as the identified segments, and the content extraction module 140 generates a first embedding based on the pre-processed first image data 110. The first embedding represents content in the first image data 110, such as shapes and positions of objects or features (e.g., based on the identified segments) in the first image data 110. In an example implementation, the first embedding generated using the first image data 110 can represent positions and dimensions of features, while the first embedding omits superfluous information, such as color or texture information of the first image data 110. The content extraction module 140 can use various techniques to extract content information, such as image segmentation or edge detection to partition an image into parts or regions based on pixel characteristics. The content extraction module 140 can include a pretrained segmentation model configured to generate embeddings based on layers of a segmented image, such as based on inputs comprising eyes, a mouth, ears, hair, and so forth. In various implementations, the content extraction module 140 can include models configured for specific styles, such as a watercolor style, an animation style, a photographic style, or the like. For example, to detect content of a watercolor image, a model can be configured to receive a blurred image from which shapes and global colors can be identified, but other details may not be identifiable (e.g., texture, traces). Other models included in the content extraction module 140 can similarly be configured to identify content in specific image styles.

The style extraction module 145 includes pre-processing logic and at least a portion of a ML model (e.g., a style encoder) configured to receive the second image data 115 and extract style information from the second image data 115. For example, the style extraction module 145 pre-processes the second image data 115 to identify one or more features present in the second image data 115, such as color information and texture information, and the style extraction module 145 can generate a second embedding based on the pre-processed second image data 115. The second embedding represents features of the second image data 115, such as the identified color information and texture information. In an example implementation, the second embedding generated using the second image data 115 can represent color information, texture information, or other characteristics of the second image data 115, while the second embedding omits superfluous information, such as content information of the second image data 115. The style extraction module 145 can use various techniques to extract style information, such as analyzing color values of pixels or groups of pixels. In various embodiments, the style extraction module 145 can use a segmentation model to encode style information of different segments of an image. In various embodiments, the second image data 115 can be pre-processed by applying a mask based on different segments of the second image data 115, and the masked data can be provided to an encoder of the style extraction module 145 to generate an embedding.

The modified image generation module 150 receives the first embedding generated by the content extraction module 140 and the second embedding generated by the style extraction module 145, and the modified image generation module 150 generates a modified image 120. For example, the modified image generation module 150 includes at least a portion of a ML model (e.g., a decoder) configured to perform concatenation to generate the modified image 120 using the first embedding and the second embedding. In various embodiments, the modified image generation module 150 includes a decoder that is trained together with one or more encoders discussed above with reference to the content extraction module 140, the style extraction module 145, or both, such that the decoder and the one or more encoders are trained as one whole model. In various embodiments, the whole model can be an autoencoder configured or trained to encode an input image into a compressed and meaningful representation, and then decode it back such that the reconstructed image is as similar as possible to the original one. Training the decoder or the whole model can include determining or configuring (e.g., optimizing) one or more loss functions, which is further discussed below with reference to FIG. 2.

In the depicted example, the second image data 115 can be in an animation style, while the first image data 110 is in a photographic style. The system 105 extracts the content of the first image data 110 and generates the modified image 120 using this extracted content, but in the animation style of the second image data 115, as indicated by the simplified depiction of specific features in the modified image 120 (e.g., hair, eyebrows, clothing, nose, etc.).

Advantageously, the modified image 120 generated by the modified image generation module 150 retains the content of the first image data 110 while discarding superfluous information in the first image data 110, such as color or texture information, and it retains the style of the second image data 115 while discarding superfluous information in the second image data 115. While examples described herein describe applying a single style from second image data 115, any number of image styles can be applied. For example, style information can be extracted from multiple images using the style extraction module 145, and weights can be determined (e.g., selected by a user) to determine an amount of influence from each respective style (e.g., to apply 70% of a first style and 30% of a second style). Additionally or alternatively, different styles can be applied to different portions or segments of an image.

Modules of the system 105 can use various ML models, and a specific example of a model is described with reference to FIG. 2 below. As used herein, a "model" or "ML model" can refer to a construct that is trained using training data to make predictions or provide probabilities for new data items, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models and/or associated techniques include, without limitation: neural networks, support vector machines, decision trees, Parzen windows, Bayes, clustering, reinforcement learning, probability distributions, decision trees, decision tree forests, and others. Models can be configured for various situations, data types, sources, and output formats. A model trained by the system 105 can include a neural network with multiple input nodes that receive training datasets. The input nodes can correspond to functions that receive the input and produce results. These results can be provided to one or more levels of intermediate nodes that each produce further results based on a combination of lower-level node results. A weighting factor can be applied to the output of each node before the result is passed to the next layer node. At a final layer, ("the output layer,") one or more nodes can produce a value classifying the input that, once the model is trained, can be used to extract image features and/or generate modified images using embeddings. In some implementations, such neural networks, known as deep neural networks, can have multiple layers of intermediate nodes with different configurations, can be a combination of models that receive different parts of the input and/or input from other parts of the deep neural network, or are convolutions-partially using output from previous iterations of applying the model as further input to produce results for the current input.

A model can be trained with supervised learning (e.g., self-supervised). Testing data can then be provided to the model to assess accuracy. Testing data can be, for example, a portion of the entire dataset (e.g., 10%) held back to use for evaluation of the model. Output from the model can be compared to the desired or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new data.

Figure 2:
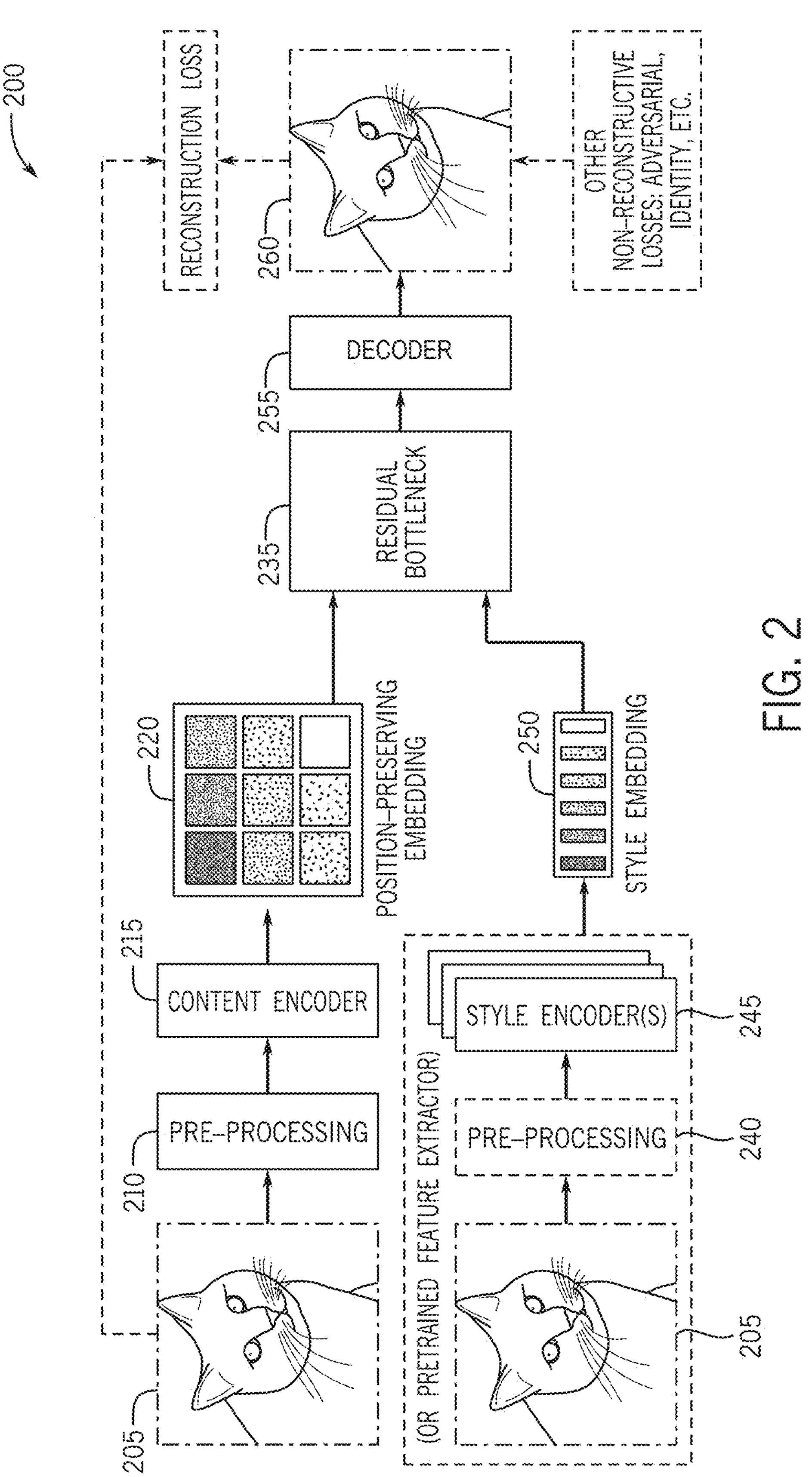
FIG. 2 is a block diagram illustrating a system flow for training a machine-learned model for image style transfer.

FIG. 2 is a block diagram illustrating a system flow 200 for training a ML model for image style transfer. The system flow 200 can be used to train a ML model that includes a content encoder 215 (e.g., 140 of FIG. 1), a style encoder 245 (e.g., 145 of FIG. 1), and a decoder 255 (e.g., 150 of FIG. 1). In some implementations, the content encoder 215, the style encoder 245, and the decoder 255 are each separate ML models.

The system flow 200 begins when image data 205 is received. The image data 205 comprises reference images for training the models. The image data 205 includes content information and non-content information (e.g., style information).

In a first branch of the system flow 200 for training the content encoder 215, the image data 205 is pre-processed at a block 210. Pre-processing the image data can comprise modifying the image in various ways, such as by cropping the image to retain only relevant content, discarding superfluous data (e.g., color and texture data), identifying content (e.g., features), identifying specific segments or portions of an image, and so forth. The pre-processed data is then received by the content encoder 215, and the content encoder 215 generates a position-preserving embedding 220. The position-preserving embedding 220 represents the content present in the image data 205. In the depicted example, the position-preserving embedding 220 can comprise information regarding the contents of the image data 205 (e.g., the face of a cat, its positions, dimensions, components, etc.), but the position-preserving embedding does not retain information about colors in the image data 205, textures in the image data 205, or the like. The position-preserving embedding 220 is provided to a residual bottleneck 235 for further processing.

In a second branch of the system flow 200 for training the style encoder 245, the image data 205 is pre-processed at block 240, such as by discarding superfluous data (e.g., content information). The pre-processed data is then received by the style encoder 245, and the style encoder 245 generates a style embedding 250. The style embedding 250 includes information regarding style (e.g., color and texture) of the image data 205, but the style embedding 250 does not retain information about content of the image data 205. The style embedding 250 can characterize, for example, that the image data 205 comprises a color photograph. The style embedding 250 is provided to the residual bottleneck 235 for further processing.

The residual bottleneck 235 and the decoder 255 include at least a portion of a ML model that together combine and concatenate the position-preserving embedding 220 and the style embedding 250 to generate an output image 260. The output image 260 is then compared to the image data 205 to determine one or more loss functions indicating accuracy of the ML model included in the system flow 200 (e.g., 215, 245, 235, 255). Examples of loss functions include reconstruction loss, adversarial loss, identity loss, or the like. The loss functions indicate whether the models can accurately extract features (e.g., content and style) of the image data 205 and reconstruct the image based on the extracted features. The system flow 200 can be repeated any number of times, and weights associated with the models can be adjusted (e.g., iteratively) until the trained models meet or exceed a threshold accuracy (e.g., 70%, 80%, 90%, 99%).

In various embodiments, the system flow 200 is used to train a whole model (e.g., comprising content encoder 215, style encoder 245, and decoder 255) such that a first input is received that includes content information of the image data 205 and a second input is received that includes style information of the image data 205, and such that the first input does not contain style information and the second input does not contain content information. From those two inputs, the whole model is trained to reconstruct the image data 205 (e.g., as the output image 260) within a threshold accuracy. The training process is guided by loss functions, which can be combined and used to determine weights. The system flow 200 can use a reconstruction loss, which is based on a comparison between the original image (e.g., 205) and the result (e.g., 260)—that is, if the style information and the content information are extracted from the same image, then the output of the model should closely match the original image, based on the calculated reconstruction loss. Other examples of loss functions include adversarial loss, which can be determined based on a general adversarial network (GAN).

In some implementations, a loss function can be generated using another ML model, such as a model trained to classify an image (e.g., as a face, an animal, an object). This model can then be used to generate a loss function to determine whether inputs are close/similar to outputs (e.g., whether both the input and the output are classified as images of a cat). While a classifier can be used to determine whether an output image is classified the same as an input image, it may be unable to determine whether the actual image content is the same within a threshold accuracy (e.g., whether the same cat is depicted, whether the cat is depicted in the same style).

In some implementations, a weighted combination of loss functions can be used. For example, a face detection model can be used in combination with other loss functions (e.g., adversarial loss, reconstruction loss, identity loss), and appropriate weights for the respective loss functions or models can be determined as part of the system flow 200.

Figure 3:
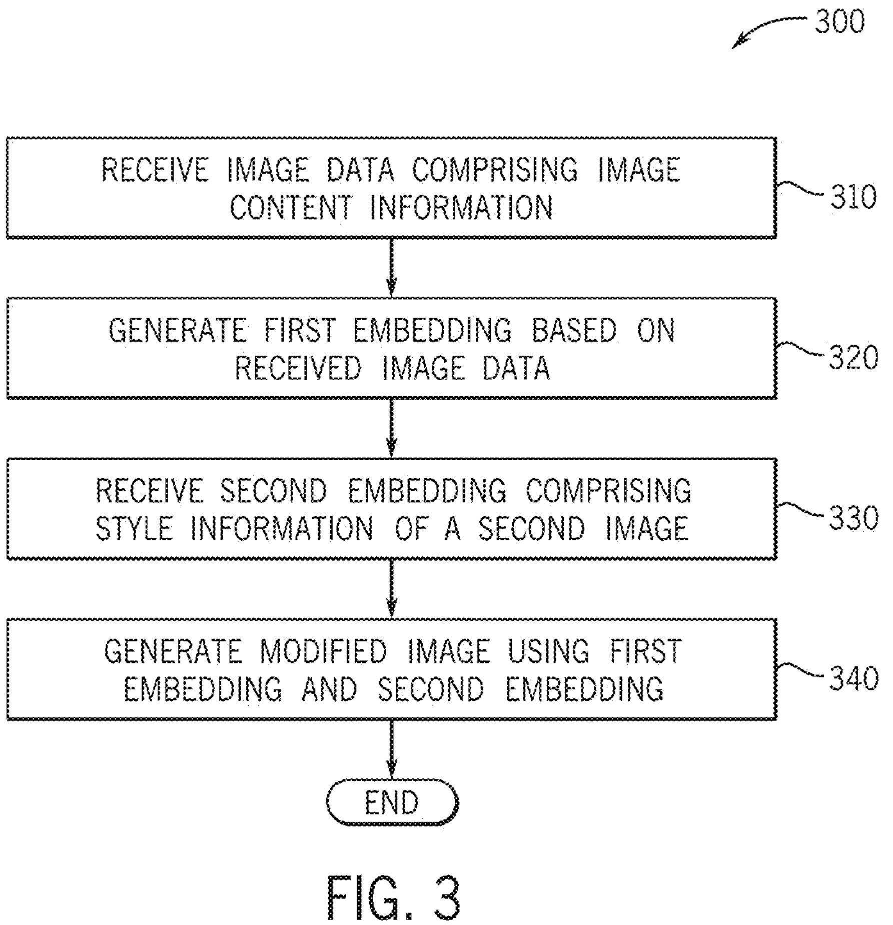
FIG. 3 is a flow diagram illustrating a process performed using an image style transfer system.

FIG. 3 is a flow diagram illustrating a process 300 performed using an image style transfer system (e.g., system 105). The process 300 can be performed to generate modified images (e.g., 120 of FIG. 1) using style information and content information of different images (e.g., 110 and 115 of FIG. 1).

At block 310, image data (e.g., 110 of FIG. 1) is received comprising image content information. The content information can represent objects or features present in an image, such as characters, animals, inanimate objects, facial features, buildings, or the like. In some implementations, the received image data is pre-processed to extract the image content information, such as by applying a mask, performing segmentation to identify features, or discarding superfluous data, such as color or texture information that will not be included in the modified image generated using the process 300. The image data received at block 310 comprises an image that a user wishes to modify—that is, the user can provide the image data at block 310 to indicate an original image to which style information of a different image will be transferred.

At block 320, a first embedding is generated by an encoder using the image data received at block 310. For example, the embedding can be generated to represent the content information included in the image data. The embedding can indicate, for example, shapes, dimensions, or positions of objects included in the received image data. The embedding is a representation of the content information in a dimensional space, such as a set of coordinates or a vector representation.

At block 330, a second embedding is received, which comprises style information of a different image (e.g., 115 of FIG. 1). The second embedding represents style characteristics of a different image, including color and texture information. The second embedding represents the style information that will be applied to the content information represented in the first embedding generated at block 320. The second embedding is generated using a style encoder.

In some implementations, the second embedding is generated at block 330 based on different received image data. In other words, style information can be extracted from the different image received at block 330, and content information can be extracted from the original image received at block 310.

At block 340, a modified image (e.g., 120 of FIG. 1) is generated using the first embedding and the second embedding. The modified image can be generated using a decoder. The modified image can be generated by concatenating the first embedding and the second embedding to generate an image having the content information of the image data received at block 310 and the style information represented in the second embedding received or generated at block 330.

In some implementations, the process 300 includes generating a training dataset and training a ML model comprising one or more encoders and one or more decoders (e.g., using the system flow 200 of FIG. 2).

In some implementations, the process 300 includes evaluating accuracy of a ML model, and retraining the ML model when the accuracy is below a threshold accuracy (e.g., 70%, 80%, 90%, 95%). Retraining the model can include adjusting one or more weights of the model and/or training the model at least a second time using a same training dataset or a different training dataset.

Operations can be added to or removed from the process 300 without deviating from the teachings of the present disclosure. One or more operations of the process 300 can be performed in any order, including performing operations in parallel, and the process 300 or portions thereof can be repeated any number of times.

In an example implementation, the process 300 is used to apply a style of a second image (e.g., represented in the second embedding received at block 330) to a first image (e.g., received at block 310). For example, the first image may be a photograph, and the second image may be a real or simulated watercolor painting. Using the process 300, the content of the first image can be retained (e.g., one or more people present in the first image), while the style of the second image can be applied to the content of the first image. That is, the process 300 can be used to generate a simulated watercolor image based on a received photograph. The style of the second image can be applied to the first image even where the content of the respective images differ substantially. Other examples may include applying different animation styles or artistic styles to the original image.

Figure 4:
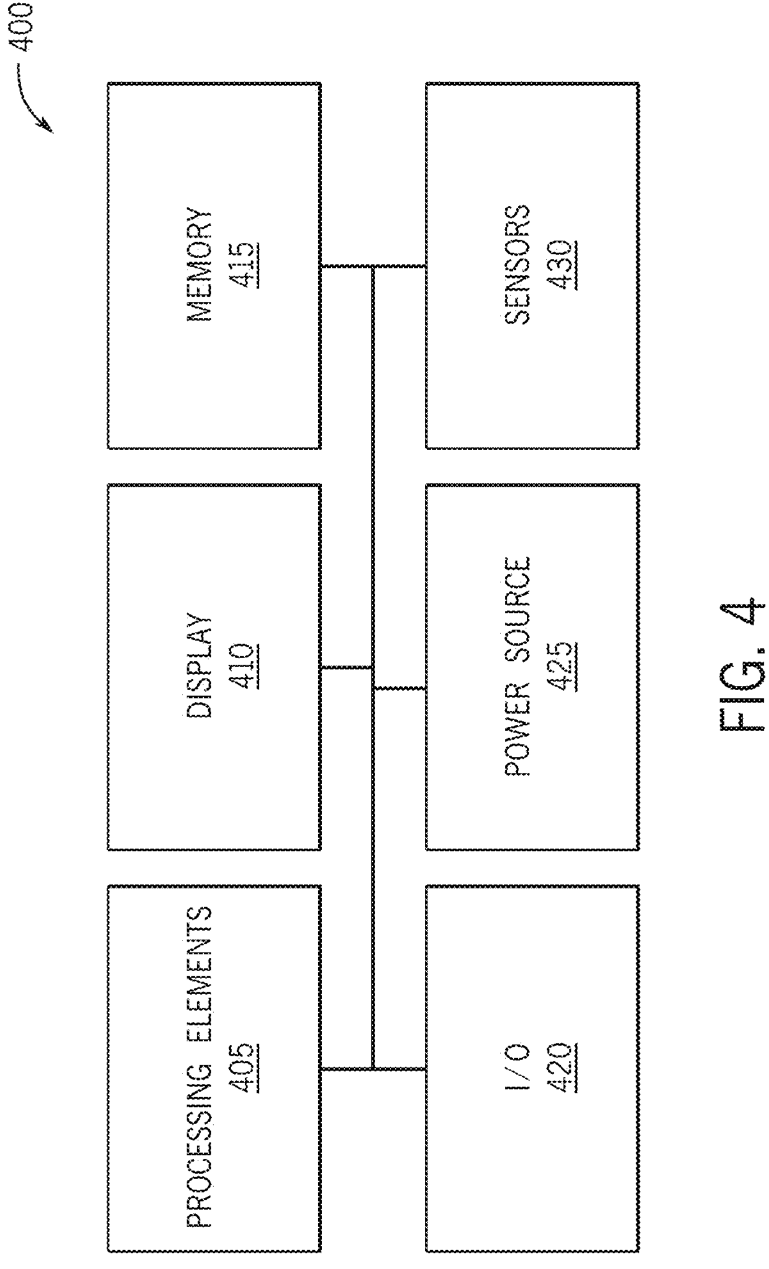
FIG. 4 is a block diagram illustrating a computing device for implementing an image style transfer system.

FIG. 4 is a block diagram illustrating a computing device 400 for implementing an image style transfer system (e.g., system 105). For example, at least a portion of the computing device 400 can comprise the system 105, or at least a portion of the system 105 can comprise the computing device 400.

The computing device 400 includes one or more processing elements 405, displays 410, memory 415, an input/output interface 420, power sources 425, and/or one or more sensors 430, each of which may be in communication either directly or indirectly.

The processing element 405 can be any type of electronic device and/or processor (e.g., processor 125) capable of processing, receiving, and/or transmitting instructions. For example, the processing element 405 can be a microprocessor or microcontroller. Additionally, it should be noted that select components of the system may be controlled by a first processor and other components may be controlled by a second processor, where the first and second processors may or may not be in communication with each other. The device 400 may use one or more processing elements 405 and/or may utilize processing elements included in other components.

The display 410 provides visual output to a user and optionally may receive user input (e.g., through a touch screen interface). The display 410 may be substantially any type of electronic display, including a liquid crystal display, organic liquid crystal display, and so on. The type and arrangement of the display depends on the desired visual information to be transmitted (e.g., can be incorporated into a wearable item such as glasses, or may be a television or large display, or a screen on a mobile device).

The memory 415 (e.g., memory/storage 135) stores data used by the device 400 to store instructions for the processing element 405, as well as store data for the image style transfer system, such as models, received image data, modified images, and so forth. The memory 415 may be, for example, magneto-optical storage, read only memory, random access memory, erasable programmable memory, flash memory, or a combination of one or more types of memory components. The memory 415 can include, for example, one or more non-transitory computer-readable media carrying instructions configured to cause the processing element 405 and/or the device 400 or other components of the system to perform operations described herein.

The I/O interface 420 provides communication to and from the various devices within the device 400 and components of the computing resources to one another. The I/O interface 420 can include one or more input buttons, a communication interface, such as WiFi, Ethernet, or the like, as well as other communication components, such as universal serial bus (USB) cables, or the like. In some implementations, the I/O interface 420 can be configured to receive voice inputs and/or gesture inputs.

The power source 425 provides power to the various computing resources and/or devices. The image style transfer system may include one or more power sources, and the types of power source may vary depending on the component receiving power. The power source 425 may include one or more batteries, wall outlet, cable cords (e.g., USB cord), or the like.

The sensors 430 may include sensors incorporated into the image style transfer system. For example, the sensors 430 can include one or more cameras or other image capture devices for capturing images.

Components of the device 400 are illustrated only as examples, and illustrated components can be removed from and/or added to the device 400 without deviating from the teachings of the present disclosure. In some implementations, components of the device 400 can be included in multiple devices.

The disclosed systems and method advantageously allow efficient and accurate transfer of style information from different images. For example, a style of a first image can be seamlessly applied to content of a second image. Various embodiments allow many-to-many style transfer in real time (e.g., seconds or less), and style information can be transferred to different image content even where substantial differences exist between respective first and second images, such as different styles, different content, different features, different proportions, and so forth.

The technology described herein can be implemented as logical operations and/or modules in one or more systems. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations can be performed in any order, unless explicitly claimed otherwise or unless a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology can be employed in special-purpose devices independent of a personal computer.

The above specification, examples and data provide a complete description of the structure and use of example embodiments as defined in the claims. Although various example embodiments are described above, other embodiments using different combinations of elements and structures disclosed herein are contemplated, as other implementations can be determined through ordinary skill based upon the teachings of the present disclosure. It is intended that all matter contained in the above description and shown in the accompanying drawings shall be interpreted as illustrative only of particular embodiments and not limiting. Changes in detail or structure can be made without departing from the basic elements as defined in the following claims.

What is claimed is:

1. A computer-implemented method of generating modified images using content information and style information, the method comprising:

receiving first image data comprising image content information, wherein the image content information comprises positional information of a first object and a second object in the first image data;

generating, using a content encoder, a first embedding comprising the image content information, wherein the content encoder extracts the image content information from the first image data to generate the first embedding;

receiving a second embedding and a third embedding generated by a style encoder, the second embedding comprising first style information of second image data, the third embedding comprising second style information of third image data, wherein the first style information and the second style information each comprises at least one of color information or texture information; and generating, by a decoder, a modified image using the first embedding, the second embedding, and the third embedding, wherein the modified image comprises the image content information of the first image data, the first style information of the second image data, and the second style information of the third image data, wherein the generating the modified image comprises:

applying a first style to the first object based on the first style information, wherein the applying the first style comprises applying a first user-selected weight of the first style to the first object; and applying a second style to the second object based on the second style information, wherein the applying the second style comprises applying a second user-selected weight of the second style to the second object.

2. The computer-implemented method of claim 1, wherein the first object and the second object correspond to different facial features in the first image data.

3. The computer-implemented method of claim 1, wherein the content encoder, the style encoder, and the decoder are included in a machine-learned (ML) model.

4. The computer-implemented method of claim 3, further comprising:

receiving a plurality of training image data comprising a plurality of image content information and a plurality of style information;

generating a training dataset using the received plurality of training image data, wherein the received plurality of training image data is pre-processed by performing segmentation to identify features in the plurality of image content information; and training the ML model using the generated training dataset, wherein the training comprises determining a set of loss functions and corresponding weights for the loss functions.

5. The computer-implemented method of claim 4, further comprising:

evaluating accuracy of the trained ML model using a testing dataset comprising at least a portion of the training dataset; and retraining the trained ML model when the accuracy does not exceed a threshold accuracy, wherein the retraining comprises adjusting a set of weights or training the ML model using a different training dataset.

6. The computer-implemented method of claim 1, wherein at least one of the first style information or the second style information is associated with an animation style or an artistic style or technique.

7. The computer-implemented method of claim 1, wherein the style encoder extracts the first style information and the second style information from different images.

8. The computer-implemented method of claim 1, wherein the image content information comprises positional information of a third object in the first image data, and wherein the method further comprises applying a third style to the third object based on third style information, wherein the first style, the second style, and the third style are different styles.

9. The computer-implemented method of claim 8, wherein the first object, the second object, and the third object correspond to different facial features in the first image data.

10. A non-transitory computer-readable medium carrying instructions that, when executed by a computing system, cause the computing system to perform operations comprising:

receive first image data comprising image content information, wherein the image content information comprises positional information of a first object and a second object in the first image data;

generate, using a content encoder, a content embedding comprising the image content information, wherein the content encoder extracts the image content information from the first image data to generate the content embedding;

receive a first style embedding and a second style embedding generated by a style encoder, the first style embedding comprising first style information of second image data, the second style embedding comprising second style information of third image data, wherein the first style information comprises at least one of first color information or texture information, and wherein the second style information comprises at least one of second color information or texture information; and generate, by a decoder, a modified image using the content embedding, the first style embedding, and the second style embedding, wherein the modified image comprises the image content information of the first image data, the first style information of the second image data, and the second style information of the third image data, wherein the modified image comprises a first style applied to the first object and a second style applied to the second object, wherein the first style is applied based on a first user-selected weight of the first style to the first object, and wherein the second style is applied based on a second user-selected weight of the second style to the second object.

11. The non-transitory computer-readable medium of claim 10, wherein the content encoder, the style encoder, and the decoder are included in a machine-learned (ML) model.

12. The non-transitory computer-readable medium of claim 11, wherein the operations further comprise:

receive a plurality of training image data comprising a plurality of image content information and a plurality of style information;

generate a training dataset using the received plurality of training image data, wherein the received plurality of training image data is pre-processed by performing segmentation to identify features in the plurality of image content information; and train the ML model using the generated training dataset, wherein the training comprises determining a set of loss functions and corresponding weights for the loss functions.

13. The non-transitory computer-readable medium of claim 12, wherein the operations further comprise:

evaluate accuracy of the trained ML model using a testing dataset comprising at least a portion of the training dataset; and retrain the trained ML model when the accuracy does not exceed a threshold accuracy, wherein the retraining comprises adjusting a set of weights or training the ML model using a different training dataset.

14. The non-transitory computer-readable medium of claim 10, wherein each of the first style information and the second style information is associated with an animation style or an artistic style or technique.

15. A computing system comprising:

at least one processor; and at least one non-transitory memory carrying instructions that, when executed by the at least one processor, cause the computing system to perform operations comprising:

receive first image data comprising image content information, wherein the image content information comprises positional information of a first object and a second object in the first image data;

generate, using a content encoder, a content embedding comprising the image content information, wherein the content encoder extracts the image content information from the first image data to generate the content embedding;

receive a first style embedding and a second style embedding generated by a style encoder, the first style embedding comprising first style information of second image data, the second style embedding comprising second style information of third image data, wherein the first style information comprises at least one of first color information or texture information, and wherein the second style information comprises at least one of second color information or texture information; and generate, by a decoder, a modified image using the content embedding, the first style embedding, and the second style embedding, wherein the modified image comprises the image content information of the first image data, the first style information of the second image data, and the second style information of the third image data, wherein the modified image comprises a first style applied to the first object based on a first weight and a second style applied to the second object based on a second weight, wherein the first weight and the second weight are selected by a user.

16. The computing system of claim 15, wherein the content encoder, the style encoder, and the decoder are included in a machine-learned (ML) model, and wherein the operations further comprise:

receive a plurality of training image data comprising a plurality of image content information and a plurality of style information;

generate a training dataset using the received plurality of training image data, wherein the received plurality of training image data is pre-processed by performing segmentation to identify features in the plurality of image content information; and train the ML model using the generated training dataset, wherein the training comprises determining a set of loss functions and corresponding weights for the loss functions.

17. The computing system of claim 16, wherein the operations further comprise:

evaluate accuracy of the trained ML model using a testing dataset comprising at least a portion of the training dataset; and retrain the trained ML model when the accuracy does not exceed a threshold accuracy, wherein the retraining comprises adjusting a set of weights or training the ML model using a different training dataset.

18. The computing system of claim 15, wherein the second style information is associated with an animation style or an artistic style or technique different than the first style information.

19. The computing system of claim 15, further comprising extracting the first style information and the second style information from different images.

20. A computer-implemented method of generating modified images, the method comprising:

receiving first image data comprising image content information, wherein the image content information comprises positional information of a first object and a second object in the first image data;

generating, using a content encoder, a first embedding comprising the image content information, wherein the content encoder extracts the image content information from the first image data to generate the first embedding;

receiving a second embedding and a third embedding generated by a style encoder, the second embedding comprising first style information of second image data, the third embedding comprising second style information of third image data, wherein the first style information and the second style information each comprises at least one of color information or texture information; and generating, by a decoder, a modified image using the first embedding, the second embedding, and the third embedding, wherein the modified image comprises the image content information of the first image data, the first style information of the second image data, and the second style information of the third image data, wherein the generating the modified image comprises:

applying a first weight of a first style to the first object based on the first style information; and applying a second weight of a second style to the second object based on the second style information, wherein the first weight and the second weight are selected by a user.

21. The computer-implemented method of claim 20, wherein the generating the modified image comprises discarding superfluous information of the first image data based on the second embedding or the third embedding.

22. The computer-implemented method of claim 20, wherein the first object comprises a first facial feature of a face in the first image data, and wherein the second object comprises a second facial feature of the face.

23. A computer-implemented method of generating modified images, the method comprising:

receiving first image data comprising image content information, wherein the image content information comprises positional information of a first object and a second object in the first image data;

generating, using a content encoder, a first embedding comprising the image content information, wherein the content encoder extracts the image content information from the first image data to generate the first embedding;

receiving a second embedding and a third embedding generated by a style encoder, the second embedding comprising first style information of second image data, the third embedding comprising second style information of third image data, wherein the first style information and the second style information each comprises at least one of color information or texture information; and generating, by a decoder, a modified image using the first embedding, the second embedding, and the third embedding, wherein the modified image comprises the image content information of the first image data, the first style information of the second image data, and the second style information of the third image data, wherein the generating the modified image comprises:

applying a first weight of a first style to the first object based on the first style information;

applying a second weight of a second style to the second object based on the second style information; and discarding superfluous information of the first image data based on the second embedding or the third embedding.

24. The computer-implemented method of claim 23, wherein the first weight and the second weight are selected by a user.

25. The computer-implemented method of claim 23, wherein: the image content information comprises positional information of a third object in the first image data; the generating the modified image comprises applying a third style to the third object based on third style information; and the first style, the second style, and the third style are different styles.

26. A computer-implemented method of generating modified images using content information and style information, the method comprising:

receiving first image data comprising image content information, wherein the image content information comprises positional information of a first object, a second object, and a third in the first image data;

generating, using a content encoder, a first embedding comprising the image content information, wherein the content encoder extracts the image content information from the first image data to generate the first embedding;

receiving a second embedding and a third embedding generated by a style encoder, the second embedding comprising first style information of second image data, the third embedding comprising second style information of third image data, wherein the first style information and the second style information each comprises at least one of color information or texture information; and generating, by a decoder, a modified image using the first embedding, the second embedding, and the third embedding, wherein the modified image comprises the image content information of the first image data, the first style information of the second image data, and the second style information of the third image data, wherein the generating the modified image comprises:

applying a first style to the first object based on the first style information;

applying a second style to the second object based on the second style information; and applying a third style to the third object based on third style information, wherein the first style, the second style, and the third style are different styles.

27. The computer-implemented method of claim 26, wherein the applying the first style comprises applying a first user-selected weight of the first style to the first object, and wherein the applying the second style comprises applying a second user-selected weight of the second style to the second object.

28. The computer-implemented method of claim 26, wherein the generating the modified image comprises discarding superfluous information of the first image data based on the second embedding or the third embedding.

* * * * *